Jan. 24, 1950 — I. E. MUSKAT — 2,495,640
METHOD OF MOLDING
Filed June 8, 1945
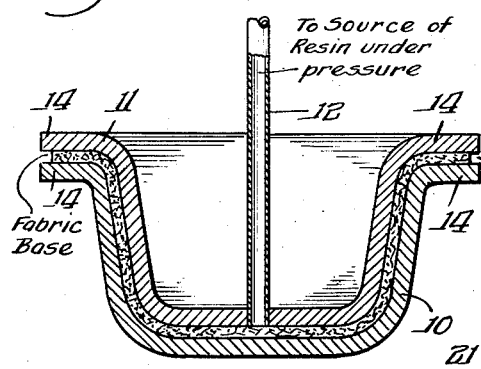
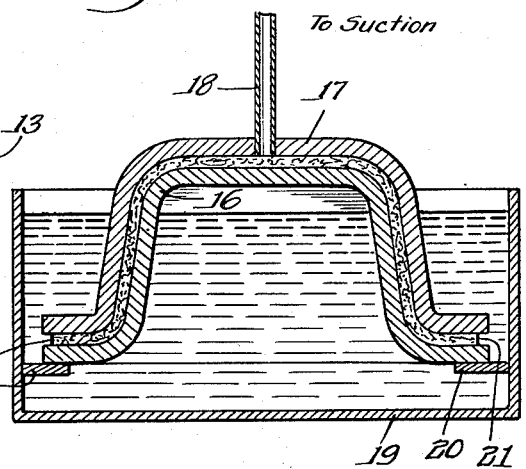
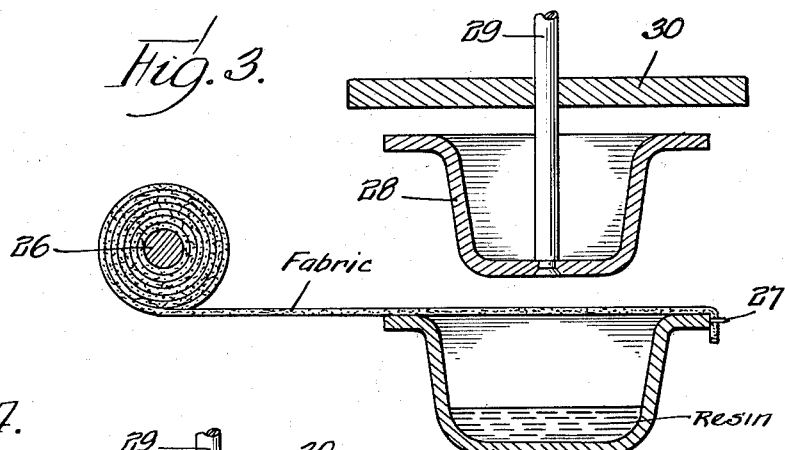
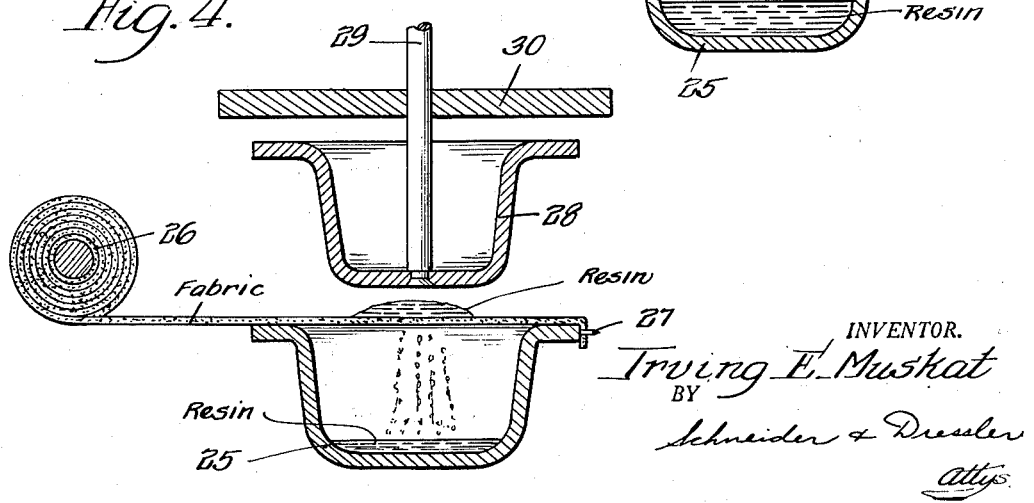
INVENTOR.
Irving E. Muskat
BY Schneider & Dressler
Attys.

Patented Jan. 24, 1950

2,495,640

UNITED STATES PATENT OFFICE 2,495,640

METHOD OF MOLDING

Irving E. Muskat, Plainfield, N. J., assignor to Marco Chemicals, Inc., a corporation of New Jersey Application June 8, 1945, Serial No. 598,339

17 Claims. (Cl. 154—110)

This invention relates to a method of preparing fiber-reinforced resinous parts, and particularly, to a method of making shaped laminated resin sheets or parts.

It is known to form laminated fabric sheets or other elements by impregnating a plurality of assembled sheets with resin and curing the assemblage in a press under high pressure, in the order of about 1,000 to 2,000 pounds per square inch and even higher. Such processes are often ob'ectionable because of the expensive equipment required and further because products of limited size and shape only can be produced due to the high pressures which must be developed.

More recently certain laminated resinous parts have been formed without substantial pressure by inserting a stack of impregnated sheets between a pair of glass sheets and curing the assemblage. In such a case the products obtained often are irregularly impregnated and contain insufficient or excessive resin and exhibit unsightly blemishes, drain marks, blisters and similar defects which weaken the laminate or otherwise impair its use. Furthermore the breakage of glass in the process is often so serious as to make the process unfeasible from a commercial standpoint.

Use of metal plates in lieu of the glass in such a process has not proven satisfactory due to the greater weight of such parts and the greater tendency to produce defective products, since the metal plates are opaque and the formation of defects cannot be readily detected.

The problem is particularly acute when fabric sheets or parts of a curved or similarly shaped cross section are produced by this method, since the mating molds used must fit accurately and often slight inaccuracies in the shape of the molds will cause production of products which are defective due to drainage, wrinkles, blister formation, etc.

In order to avoid the expense of accurately machined pairs of mating molds, shaped resin laminates have been prepared by laying an impregnated fibrous sheet or stack of sheets upon a mold of desired shape or contour, and either enclosing the mold and the fibrous sheets in a rubber bag and evacuating the bag or positioning a bag about the sheets on the mold and inflating the bag within a confined space. These processes require the use of specially prepared bags of substantial weight in order to withstand the differential pressures, and moreover, the bags can be used for a limited number of times only before breaking down under curing temperatures. Furthermore, the bags generally must be constructed to a special shape for each type of part. Consequently these processes are objectionably expensive. In addition, the production of articles which are uniformly impregnated with a controlled amount of resin is difficult.

In all of these prior art processes the fibrous base in sheet or laminate form is preliminarily impregnated at least to the desired extent and usually with an excess of the resinous material and then cut to size and inserted in a flat mold, or draped, tailored or otherwise formed about a curved mold. The handling of the material to be consolidated or molded in a wet state by the worker is objectionable because of the harmful effects to the skin and because of the difficulty in draping and tailoring the wet material about the mold. Where such draping and tailoring is required about molds of curved contour the results are not uniform and are usually sloppy, not infrequently requiring that the molded part be discarded. Apart from this, the handling of wet materials is wasteful of the resin, for it drains from the base, falling either on the worker, the floor or some part of equipment from which it must be removed, and if great care and speed are not exercised in the handling, the drainage of resin from the base is of such magnitude as to leave insufficient resin in the base to effect the desired consolidation or molding. In addition to the foregoing, the handling of wet laminates causes air to be entrapped between the layers and this must be removed prior to curing of the laminate, particularly where polymerizable impregnating resins have been used, for otherwise the laminates are weakened or require reworking or rejection because of imperfections in the surface of the laminates, resulting from the escape of entrapped air during the molding and/or curing operations.

In accordance with the present invention resin-bonded fibrous laminated sheets of large size or products of a wide variety of shapes or contours may be produced without the drainage, blemish formations and irregular impregnations encountered in the prior art processes, and without use of expensive presses and molds usually required in laminating processes. These laminates may be produced without pressure or with low pressures up to about 300 pounds per square inch, as desired. They may also be produced with higher pressures, but such high pressures are not necessary, and in many instances, are objectionable.

The method of the present invention contemplates the handling of the fibrous base to be impregnated, including cutting, draping and tailoring, preferably in a substantially dry state, and the subsequent impregnation of the base in a mold with a liquid or liquefied resinous material by an applied force which serves to drive the resin into the base to impregnate it and at the same time to drive from the base all air entrapped therein. The applied force is obtained by applying an outside pressure or by imposing an internal suction to establish a pressure differential between the inside and outside of the mold.

A wide variety of simple molding apparatus and means to accomplish the foregoing lend themselves for use in carrying out the method of my invention. Thus, for example, the fibrous base in a substantially dry state may be cut to the desired size and draped and tailored about a male mold. The fibrous base may be a single sheet of any desired thickness, or it may comprise a series of sheets. In the latter case the fibrous base may be formed, if desired, by sewing, stapling or cementing together a plurality of such sheets. The assemblage may then be inserted into a complementary female mold and the resin, in liquid or liquefied form, introduced under pressure through a sprue, in either the male or female mold, into the interior of the mold to impregnate the fibrous base. The introduction of the resin into the mold is continued until the fibrous base is thoroughly impregnated and the entrapped air driven therefrom. This point is reached when the resin reaches or starts to flow from the open end of the mold, or from bleed holes provided for this purpose in a desired region in the mold. The impregnated sheet is then cured or otherwise solidified either with or without applied pressure on the mold, and with heating or without heating of the mold, depending on the character of the resinous material used. Alternately, for example, the impregnation of the fibrous base positioned between the mating surfaces of complementary molds, as above described, may be effected by inserting the assemblage in a bath of the resin and sucking the resin through the base from the outer periphery thereof, in the open end of the mold, to the interior thereof, and, finally, through a conduit connected to a pump or other device for creating a vacuum. This same result may be obtained by providing tubes in each of the complementary molds or in only one of the molds, one tube being connected to a source of resin and the other to a vacuum pump, and sucking the resin up through the tube and into the mold until it is filled. Or, the desired amount of resin may be metered into a female mold and the fibrous base drawn into the liquid by means of a male mold operated by a piston or plunger, for example. When the dry base has been forced into the female mold to below the level of the resin in the bottom thereof, the resin is forced upward along the sides between the male and female mold, thereby impregnating the base and driving entrapped air therefrom. The force applied to the resin in this modification of the process of my invention is supplied by the closing of the molds. The fibrous base may be draped about the male mold or otherwise attached thereto and the assemblage inserted into the complementary female mold which contains the required amount of resin in a liquefied state. Again the resin is forced upwards by the closing of the molds.

The foregoing and other impregnating and molding procedures will be hereinafter described in greater detail.

The process of the present invention may be used to produce resin-impregnated flat and curved parts from various types of fibrous materials, such as sheets of cotton or wool fabrics, canvas, duck, muslin, linen, rayon or nylon fabrics, woven or felted glass fiber, paper, asbestos or cotton batting, sisal, macerated fabrics and other filler material etc. The process is especially effective in producing laminated products comprising a plurality of layers of the above materials, either with or without added filler material; however, individual sheets of felted or woven fibrous material may be impregnated and molded as herein described. The fibrous materials may already be impregnated with sizing, resinous materials, etc., or may have one surface coated with lacquers or other plastic and resinous products, and these may be used in accordance with the present invention as long as they are still capable of further impregnation.

The resinous materials which may be used in accordance with the present invention may be either thermosetting or thermoplastic materials, either in their molten state or natural liquid state. The invention, however, particularly lends itself for use with polymerizable materials, especially those in their natural liquid state. Thus, for example, the resinous material may be a monomer or partial polymer in its natural liquid state, such as styrene and methylmethacrylate, or liquefied thermoplastic materials such as liquefied polymerized styrene and methylmethacrylate, or condensible materials such as mono- and di-methylolureas or melamine and formaldehyde. It may also be an inter-polymer of mono-functional, polymerizable materials, such as the inter-polymers of diethyl maleate, diethyl fumarate, dimethyl maleate or dimethyl fumarate with vinyl chloride, vinyl acetate or styrene, or it may be a co-polymer of vinyl chloride and vinyl acetate.

Particularly useful polymerizable liquids for use in accordance with the present invention are the polyfunctional, oxygen-convertible esters of unsaturated dibasic acids such as maleic, fumaric, itaconic or citraconic acids or acetylene dicarboxylic acid and a polyhydric alcohol, particularly dihydric alcohols, including ethylene glycol, propylene glycol, isobutylene glycol, 1,3-trimethylene glycol, hexamethylene glycol, glycerol, methyl glycerol, phthalyl alcohol or polyhydroxy polymers of these alcohols, such as diethylene glycol, triethylene glycol, tetraethylene glycol, dipropylene glycol, polyglycerol, etc. These esters are comparatively high in molecular weight, contain at least two units of the dibasic acid and the polyhydric alcohol and are very adhesive. Such esters may include the unsaturated alkyds such as ethylene glycol maleate, ethylene glycol fumarate and ethylene glycol itaconate, formed by reaction of ethylene glycol with the unsaturated acid to an advanced stage of esterification, for example, to an acid number of 50 or below. They may also include mixed esters in which monohydric alcohols (methyl, ethyl, allyl, methallyl, propyl or tetrahydrofurfuryl alcohol) and/or monobasic acids (acetic, propionic, oleic, stearic acids, etc.) are incorporated in the reaction mixture.

In addition, polyhydric alcohol unsaturated polycarboxylic acid esters formed by reaction of glycol maleate, diethylene glycol fumarate or similar esters having an acid number of 150 or below with a monohydric alcohol such as methyl, benzyl, ethyl or propyl alcohol in amount such that the alcohol introduced exceeds that accountable for by reduction in acid number may also be used. Such esters and the preparation thereof are described in United States Letters Patent No. 2,418,633, granted April 8, 1947 to Charles Gould, which is assigned to the same assignee as the instant application.

Often these polyhydric alcohol esters are found to be unduly viscous per se and, accordingly, impregnation of fibrous bases with such esters is very difficult. In many cases it is found advantageous to blend such esters with less viscous polymerizable liquids, including methyl methacrylate, styrene, vinyl acetate, ethyl itaconate, cyclopentadiene, dicyclopentadiene, indene, methyl alpha chloroacrylate, diallyl or dimethallyl esters including allyl carbonate, allyl phthalate, allyl maleate, allyl fumarate, allyl succinate, allyl adipate, or other corresponding polymerizable unsaturated alcohol polyesters or other compounds including divinyl benzene, glycol dimethacrylate, allyl methacrylate, allyl crotonate, etc. The amount of such diluting polymerizable liquid will be dependent upon the actual viscosity of the glycol ester used and the properties required.

The following classes of polymerizable materials may also be used in accordance with the present invention.

1. Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic, methacrylic, alpha or beta chloracrylic, crotonic or cinnamic acids, including allyl acrylate, allyl alpha chloracrylate, etc.

2. Polymerizable unsaturated alcohol polyesters of polybasic acids such as phthalic, carbonic, oxalic, succinic, adipic, azalaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate) and mixtures thereof.

3. Polyhydric alcohol esters of unsaturated acids such as acrylic, methacrylic, alpha or beta chloracrylic, crotonic, maleic, fumaric, itaconic, etc. and polyhydric alcohols such as ethylene glycol, diethylene glycol, propylene glycol, dipropylene glycol, triethylene glycol, hexaethylene glycol, glycerol, sorbitol and mannitol, including ethylene glycol diacrylate, etc.

4. Polymerizable ethers including divinyl ether, etc. and copolymers of the ethers and any of the above compounds.

5. Other organic compounds containing two or more unsaturated, unconjugated groups, including divinyl benzene, divinyl naphthalene, vinyl acetylene, divinyl acetylene, etc.

Other liquid polymerizable or condensible materials capable of curing to a thermosetting state, including glycerol phthalate, liquid phenol-aldehyde resins, melamine-aldehyde condensation products and urea condensation products alone or in admixture with the above compounds containing one or more polymerizable groups may also be used in accordance with the present invention.

Liquid compositions which are too fluid for use as such may be partially polymerized or blended with more viscous materials to secure compositions of suitable viscosity. Solid polymerizable compositions may be dissolved in polymerizable liquids or in plasticizers for use as herein contemplated.

The above polymerizable compositions are polymerized with heat and/or light usually in the presence of catalysts such as benzoyl peroxide, acetone peroxide, lauroyl peroxide or methyl ethyl ketone peroxide, as is well-known in the art.

In the drawing there are shown diagrammatically, in section, simple molds in which various modifications of the processes of the present invention may be carried out. The molds shown are hat molds; however, the molds may have other suitable shapes for molding other articles or parts of contoured configuration, or they may be flat molds for molding flat sheets. The details of the molds form no part of the present invention and the hat molds have been chosen for purposes of illustration only, because of their simplicity. It is to be understood that the molds can be treated to prevent adhesion, or lubricants or separator compounds may be used for that purpose when necessary or desirable. Cellophane, plastic sheeting, metal foils, rubber sheeting or other flexible liners may be used to permit easier removal of the cured product from the mold.

Fig. 1 shows the resin inserted into the mold under pressure. Fig. 2 shows the resin drawn into the mold by suction. Fig. 3 shows the resin in the mold before the reinforcing fabric is inserted. Fig. 4 shows the resin poured directly upon the fabric before the fabric is inserted into the mold.

Referring to Fig. 1, the female hat mold is designated 10 and the complementary male mold 11. A sprue 12 extends through male mold 11, at a central region thereof. The sprue may be connected by means of a flexible hose (not shown) to a tank (not shown) containing the desired resinous material under pressure.

In carrying out the method of my invention with the mold of Fig. 1, dry or substantially dry fibrous material, such as cotton duck, Fiberglas and the like, is draped and tailored about the male mold, as many plies of such material being used as desired, and the assemblage is then placed in the female mold. The latter may be stationary and may have heating elements in the body thereof for heating the mold to cure the resin if the latter requires curing. The mold may be jacketed for circulating steam or other heating fluid thereover to accomplish the same purpose. If the resin is a liquefied thermoplastic material, a cooling liquid may be circulated in the jacket to cool and set the resin. The resin under pressure is then fed to the space between the molds through sprue 12, and the feeding of the resin is continued until it begins to flow out of the peripheral space 13 between the overlapping ends 14 of the molds. The flow of resin is then stopped. The peripheral space 13 may be eliminated and bleed holes provided, spaced in the periphery or top of the mold, to allow for the escape of air. When the resin reaches the bleed holes, the holes may be stoppered or sealed-off to prevent loss of resin and to force the resin to fill the rest of the mold. When the resin reaches all of the bleed holes the mold is filled.

The resin thus introduced into the mold serves to impregnate the fibrous material and fill the space between the molds as it passes from the point of introduction to the open end, driving ahead of it all air, both in the space and that entrapped in the fibrous material. The resinous material forced to the open end of the mold, or to the bleed holes (not shown), seals the assemblage against reentry of air into the mold. The mold may then be heated to cure the resin, or it may be cooled to set the resin, depending upon the character of the resin used. The curing or setting of the resin-impregnated base described may be effected without applied pressure, depending only on the weight of the male mold to supply the necessary pressure, or with an applied pressure in the order of about 10 to 15 pounds per square inch up to about 250-300 pounds per square inch, as desired. Higher pressures can, of course, be used. Using a polymerizable type of resin such as ethylene glycol maleate alkyd, for example, I prefer to effect the curing of the resin-impregnated material at zero pounds applied pressure or low applied pressures up to about 250 pounds per square inch.

In carrying out the method of my invention with the mold of Fig. 2, the fibrous material is draped and tailored over an imperforate male mold 16, as before and the female mold 17, having a tube 18 passing therethrough, is placed on the material. The assemblage is then lowered into a body of liquid or liquefied resinous material within a tank 19, which is provided with a shelf 20 for supporting the assemblage, until the open end 21 of the mold is well below the level of the liquid. Pipe 18 is now connected to a vacuum pump or other suction device (not shown). The drawing of a vacuum in the space between the molds serves to cause the resin to flow through the space from the open end to tube 18. In doing so it impregnates the fibrous material and fills the space, driving ahead of it the air, as described above. When the resin begins to flow through the tube the suction is cut off and the resin impregnated material is cured or set within the mold as described above, either while the mold is still within the tank, or, preferably, removed from the tank. Tube 18 can be made of glass or other transparent material to enable the operator to observe the flow of resin therein, and thereby enable him to determine readily when the fibrous material and the space between the molds is filled with resin.

It is not necessary to insert the assemblage in a bath of the resin to impregnate the base by the suction method, for a tube may be connected from male mold 16 to a source of resin and the resin sucked up through the tube into the mold until it is filled. In using this modified form of mold, the open end 21 of the mold should, of course, be sealed, as by a sealing ring.

The force necessary to drive the resin into the fibrous base and eliminate entrapped air therefrom and from the space between the molds may be provided by the closing action of the molds. Thus, referring to Fig. 3, the desired amount of resin is metered into female mold 25 and fabric from a roll 26 is drawn across the mouth of the mold, and, if necessary, secured as by impalement on one or more pins 27 to the far side of the mold. The fabric is drawn into the female mold by the downward movement of male mold 28 operating from a piston 29 which is slidably supported by support 30. A draw ring (not shown) may be placed on the fabric prior to drawing it into the mold to prevent wrinkling. The downward movement of the male mold in the female mold is continued until resin begins to flow from the open end of the mated molds, or from bleed holes provided in the mold, as described above, and the resin-impregnated fabric is cured or set as described above. After the drawing in of the fabric, and either before or after the curing or setting step described, the drawn in fabric may be cut from the roll and removed from the pins. It is to be understood that the width of the fabric is such as to extend beyond the periphery of the end of the male mold as the fabric is being draped thereon in being drawn into the female mold. The excess of fabric can be readily trimmed from the molded material.

Referring to Fig. 4, the apparatus shown is identical with that of Fig. 3, and the only difference in the method described is that the desired amount of resin is poured directly on the fabric bridging the mouth of the female mold. Some of this resin drains or is forced by the descending male mold through the fabric into the bottom of the female mold and the descending male mold distributes the resin through the fabric and expels the entrapped air as described above.

The movement of the piston-operated male mold of Figs. 3 and 4, into and out of the female mold, may be manually controlled, or it may be controlled by a motor, in accordance with known techniques.

The process of the present invention is not to be construed as limited to use in connection with the several embodiments of molds illustrated and described, since the process may be carried out with any type of mold, either a simple flat mold or an intricate curved mold. Also, the process is not to be construed as limited to the use of fibrous material in sheet form only, since macerated fabric or other forms of filler material, powdered or otherwise, can be incorporated in the fibrous base or introduced into the mold prior to or along with the base, preliminarily to the impregnation step. Various forms of reinforcing inserts can also be introduced into the mold prior to or along with the base and be formed integral with the base during the curing or setting steps.

A further modification of my process is to use a fabric base which is already coated on one side with a cured or set resin or with a nitrocellulose or other type of lacquer, drape this base about the male mold as described above in connection with Figs. 1 and 2, with the uncoated side in contact with the mold surface, and impregnate the base and mold it as described. Or this coated fabric may be preliminarily draped in the female mold of Fig. 1, for example, with the coated surface in contact with the mold surface, the male mold with the draped and tailored fabric about it then inserted into the female mold, and the resin introduced and the molding carried out as described, thereby laminating the coated fabric to the tailored base. Or the coated fabric may be draped over the tailored base on the male mold, with its uncoated side in contact with the base, and the assemblage then introduced into the female mold and molded as described. Other modifications of the process will readily suggest themselves from the foregoing.

If it is desired to improve the gloss on the outer surface of the molded article, the mold surface adjacent this outer surface may be preliminarily coated with a resin, preferably of the thermosetting type, and partially or completely cured before the resin-impregnating and molding steps described.

The liquid resinous materials of the present invention may be compounded with relatively small amounts, say about 5 to 35%, for example, of various fillers, pigments, softeners, plasticizers, colors or other similar ingredients commonly used in the synthetic resin art, and the compounded, fluid, resinous materials used as herein described. Where the fillers and/or pigments are used in relatively large amounts, say in the order of about 60 to 80%, the compounded resinous material may no longer be in a fluid state; however, such compounded resinous materials may be used in accordance with the present invention, particularly where the resinous constituent thereof is a liquid, polymerizable resinous material, since the compounded resinous material is capable of plastic flow under heat and pressure. These compounded resinous materials are used in accordance with the present invention where force is used to drive the resinous material into the fibrous base as, for example, by the closing action of the molds, as illustrated by the molds of Figs. 3 and 4. The resulting impregnated and laminated product can then be cured by heat and pressure as described above.

Thus, for example, a liquid polymerizable resinous material which has been compounded with about 65 to 75% of a filler such as asbestos, wood flour, clay, whiting and the like is placed on the fabric stretched across the mouth of female mold 25, the male mold is brought down to close the mold and the product is cured under heat and pressure. During the closing of the mold and the molding of the product the compounded resinous material is subjected to plastic flow and some of the resin, including some filler, is forced into the fibrous base, the balance of the compound being spread over the surface thereof, and the air is driven from the base. The process may be also carried out by placing the compounded resinous material in the female mold, drawing in the fabric and closing the mold, as illustrated in Fig. 3, and then curing the product under heat and pressure. If desired, the fibrous base may be laid preliminarily in the female mold, the compounded resinous material placed thereon, and the product then cured by heat and pressure; or, prior to curing a second fibrous base may be placed on the resinous material, thereby sandwiching it between the fibrous material.

While reference has been made in the specification and claims to the removal of "air" from a fibrous base, it is to be understood that my invention contemplates the removal of any aeriform body from the base, be it air, nitrogen, carbon dioxide or the like, or a mixture of aeriform bodies.

I claim:

1. A method of molding comprising introducing into a female mold a desired amount of an unsaturated polymerizable resinous material in a liquid state, extending fibrous material in sheet form and capable of being impregnated across the mouth of said female mold, moving a complementary male mold downwardly on said fibrous material to draw it into the female mold, said movement of the male mold being continued to the bottom of the female mold, thereby forcing said resinous material between the molding surfaces and impregnating the fibrous material and substantially simultaneously expelling air therefrom to the exterior of the mold, and polymerizing the impregnated fibrous material while it is retained between said molds.

2. A method of molding comprising introducing into a female mold a desired amount of an unsaturated polymerizable resinous material in a liquid state, extending fibrous material in sheet form and capable of being impregnated across the mouth of said female mold, moving a complementary male mold downwardly on said fibrous material to draw it into the female mold, said movement of the male mold being continued to the bottom of the female mold, thereby forcing said resinous material between the molding surfaces and impregnating the fibrous material and substantially simultaneously expelling air therefrom to the exterior of the mold, and polymerizing the impregnated fibrous material while it is retained between said molds under an applied pressure not substantially above about 300 pounds per square inch.

3. A method of molding comprising extending fibrous material in sheet form and capable of being impregnated across the mouth of a female mold, placing a desired amount of an unsaturated polymerizable resinous material in a liquid state on said fibrous material, moving a complementary male mold downwardly on said resinous and fibrous materials to draw the latter into the female mold, and with it the former into the female mold, said movement of the male mold being continued to the bottom of the female mold, thereby forcing said resinous material between the molding surfaces and impregnating the fibrous material and substantially simultaneously expelling air therefrom to the exterior of the mold, and polymerizing the impregnated fibrous material while it is retained between said molds.

4. A method of molding comprising introducing into a female mold a desired amount of an unsaturated polymerizable resinous material capable of plastic flow under heat and pressure, extending fibrous material in sheet form and capable of being impregnated across the mouth of said female mold, moving a complementary male mold relatively to said female mold to force said fibrous material into the female mold, said movement of the male mold being continued until the molds are closed, and curing the materials in said mold under heat and pressure.

5. A method of molding comprising extending fibrous material in sheet form and capable of being impregnated across the mouth of a female mold, placing a desired amount of an unsaturated polymerizable resinous material capable of plastic flow under heat and pressure on said fibrous material, moving a complementary male mold downwardly on said resinous and fibrous materials to draw the latter and with it the former into the female mold, said movement of the male mold being continued to the bottom of the female mold, and curing the materials in said mold under heat and pressure.

6. A method of molding comprising placing fibrous material in sheet form and capable of being impregnated in a female mold, placing a desired amount of an unsaturated polymerizable resinous material capable of plastic flow under heat and pressure on said fibrous material, moving a complementary male mold downwardly on said resinous and fibrous materials, said movement of the male mold being continued to the bottom of the female mold, and curing the materials in said mold under heat and pressure.

7. A method of molding comprising placing fibrous material in sheet form and capable of being impregnated in a female mold, placing a desired amount of a polymerizable resinous material capable of plastic flow under heat and pressure on said fibrous material, placing a second sheet of fibrous material capable of being impregnated on said resinous material, moving a complementary male mold downwardly on said materials, said movement of the male mold being continued to the bottom of the female mold, and curing the materials in said mold under heat and pressure.

8. A method of molding comprising draping a fibrous base capable of being impregnated about a male mold, introducing into a complementary female mold a desired amount of an unsaturated polymerizable resinous material in a liquid state, moving said draped male mold downwardly in said female mold to the bottom thereof, thereby forcing said resinous material between the molding surfaces and impregnating the fibrous material and substantially simultaneously expelling air therefrom to the exterior of the mated molds, and polymerizing the impregnated fibrous material while it is retained between said molds.

9. A low pressure molding method which comprises introducing a fibrous base capable of being impregnated between complementary molds which when in closed mating position provide a mold space having an outlet for air and liquid through which the same may flow freely during impregnation of the base within the mold space, introducing an unsaturated polymerizable resinous material in free flowing liquid state into said mold space to flow progressively through said space to said outlet to impregnate the base and fill said space and to drive therefrom and from the base air contained or entrapped therein, and polymerizing and thus curing the impregnated base and resinous material while retained between said molds.

10. A low pressure molding method which comprises introducing a fibrous base capable of being impregnated between complementary molds which when in closed mating position provide a mold space having an outlet for air and liquid through which the same may flow freely during impregnation of the base within the mold space, said outlet being at an elevated position, introducing an unsaturated polymerizable resinous material in free flowing liquid state into said mold space to flow progressively from the lower portion of said space to said outlet to impregnate the base and fill said space and to drive therefrom and from the base air contained or entrapped therein, and curing the impregnated base and resinous material while retained between said molds.

11. A low pressure molding method which comprises introducing a fibrous base capable of being impregnated between complementary molds which when in closed mating position provide a molding space having an outlet for aid and liquid through which the same may flow freely during impregnation of the base within the mold space, said outlet being at an elevated position not lower than the highest point in said mold space, introducing an unsaturated polymerizable resinous material in free flowing liquid state between said molds to flow progressively from the lower portion of the mold space defined thereby to said outlet to impregnate the base and fill said space and to drive therefrom and from the base air contained or entrapped therein, the outlet opening remaining unobstructed during said filling, and polymerizing and thus curing the impregnated base and resinous material while retained between said molds.

12. A method of molding resin impregnated fibrous materials at low pressures, said method comprising positioning between complementary molds which when in closed mating position provide a mold space having an outlet for air and liquid through which the same may flow freely during impregnation of the base within the mold space, a fabric having a coating on one side thereof with the coated fabric in contact with one mold surface and a fibrous base capable of being impregnated in superimposed relation to said fabric, introducing an unsaturated polymerizable resinous material in free flowing liquid state between said molds to flow progressively through the mold space defined thereby to said outlet to impregnate the superimposed fabric and fibrous materials and fill said space and to drive therefrom and from the base air contained or entrapped therein, and polymerizing and thus curing the impregnated materials and resinous material while retained between said molds.

13. A method of molding at low pressures, said method comprising draping a fibrous base material capable of being impregnated about the mold surface of one of a pair of complementary molds which when in closed mating position provide a mold space having an outlet for air and liquid through which the same may flow freely during impregnation of the base within the mold space, bringing the molds together with the base material between the molding surfaces, introducing an unsaturated polymerizable resinous material in free flowing liquid state into the mold space between said molds to flow progressively therethrough and thereby to impregnate the base and fill said space and to drive therefrom and from the base air contained or entrapped therein, and polymerizing and thus curing the impregnated base and resinous material while retained between said molds.

14. A method of molding at low pressures, said method comprising draping a fibrous base capable of being impregnated about the mold surface of one of a pair of complementary molds which when in closed mating position provide a mold space having an outlet for air and liquid through which the same may flow freely during impregnation of the base within the mold space, said outlet being at an elevated position not lower than the highest point in the mold space defined by said molds, introducing an unsaturated polymerizable resinous material in free flowing liquid state between said molds to flow progressively from the lower portion of the mold spaced defined thereby to said outlet to impregnate the base and fill said space and to drive therefrom and from the base air entrapped therein, the outlet opening remaining unobstructed during said filling, and polymerizing and thus curing the impregnated base and resinous material while retained between said molds.

15. A method of molding at low pressures, said method comprising draping a fibrous base capable of being impregnated about the mold surface of one of a pair of complementary molds which, when in closed mating position provide a mold space having an inlet for liquid and an outlet for air and liquid through which the same may flow freely during impregnation of the base within the mold space, said outlet being at an elevated position not lower than the highest point in the mold space defined by said molds, supplying an unsaturated polymerizable resinous material in free flowing liquid state to the mold space between said molds in the lower portion thereof, evacuating the mold space from the upper portion thereof, thereby causing said resinous material to flow progressively from the lower portion of the mold space to said outlet to impregnate the base and fill said space and to withdraw therefrom and from the base air entrapped therein, the outlet opening remaining unobstructed during said filling, and polymerizing and thus curing the impregnated base and resinous material while retained between said molds.

16. A low pressure molding method which comprises introducing a porous fibrous base between complementary molds for impregnation of the base with an unsaturated polymerizable resinous material and in situ curing of the impregnated base, said complementary molds when in closed mating position having an outlet through which air driven from the mold space by the said resinous material will flow freely during the impregnation of the base, introducing an unsaturated polymerizable resinous material in free flowing liquid state into said mold space to flow progressively through said space to said outlet to impregnate the base and fill said space and to drive therefrom and from the base air contained or entrapped therein, and polymerizing and thus curing the impregnated base and resinous material while retained between said molds.

17. A low pressure molding method which comprises introducing a porous fibrous base between complementary molds for impregnation of the base with an unsaturated polymerizable resinous material and in situ curing of the impregnated base, said complementary molds when in closed mating position having an outlet through which air driven from the mold space by the said resinous material will flow freely during the impregnation of the base, said outlet being at an elevated position not lower than the highest point in the mold space defined by said molds, introducing an unsaturated polymerizable resinous material in free flowing liquid state into said mold space to flow progressively through said space to said outlet to impregnate the base and fill said space and to drive therefrom and from the base air contained or entrapped therein, and polymerizing and thus curing the impregnated base and resinous material while retained between said molds.

IRVING E. MUSKAT.

REFERENCES CITED

The following references are of record in the file of this patent:

UNITED STATES PATENTS

| Number | Name | Date |
| --- | --- | --- |
| 1,974,261 | Clarke | Sept. 18, 1934 |
| 1,993,942 | Novotny | Mar. 12, 1935 |
| 1,997,074 | Novotny | Apr. 9, 1935 |